(12) United States Patent
San Miguel et al.

(10) Patent No.: US 11,086,025 B2
(45) Date of Patent: Aug. 10, 2021

(54) INTEGRATED VISUAL GEO-REFERENCING TARGET UNIT AND METHOD OF OPERATION

(71) Applicant: PROPELLER AEROBOTICS PTY LTD, Surry Hills (AU)

(72) Inventors: Rory Leon San Miguel, Surry Hills (AU); Frederick James Greer, Newton (AU)

(73) Assignee: Propeller Aerobotics Pty Ltd, New South Wales (AU)

( * ) Notice: Subject to any disclaimer, the term of this patent is extended or adjusted under 35 U.S.C. 154(b) by 329 days.

(21) Appl. No.: 15/752,199

(22) PCT Filed: Aug. 12, 2016

(86) PCT No.: PCT/AU2016/050743
§ 371 (c)(1),
(2) Date: Feb. 12, 2018

(87) PCT Pub. No.: WO2017/024358
PCT Pub. Date: Feb. 16, 2017

(65) Prior Publication Data
US 2018/0239031 A1    Aug. 23, 2018

(30) Foreign Application Priority Data
Aug. 13, 2015  (AU) ................................ 2015903258

(51) Int. Cl.
*G01S 19/45* (2010.01)
*G01S 19/42* (2010.01)
(Continued)

(52) U.S. Cl.
CPC .............. *G01S 19/45* (2013.01); *G01S 19/42* (2013.01); *G01C 11/00* (2013.01); *G01C 11/025* (2013.01);
(Continued)

(58) Field of Classification Search
CPC ........ G01S 19/45; G01S 19/42; G01S 19/421; G01C 11/00; G01C 11/025; G01C 21/005; G01C 21/04
(Continued)

(56) References Cited

U.S. PATENT DOCUMENTS 7,636,901 B2 * 12/2009 Munson ............... G09B 29/106
715/790
8,849,551 B2 * 9/2014 Gadler ................... G01C 21/32
701/117
(Continued)

FOREIGN PATENT DOCUMENTS

WO    WO 2015/103689    7/2015

*Primary Examiner* — Chuong P Nguyen
(74) *Attorney, Agent, or Firm* — David R. Stevens; Stevens Law Group

(57) ABSTRACT

Integrated Visual Geo-referencing Target Unit ABSTRACT A georeferencing target unit including: a generally planar top surface including a visual marker structure on the top surface, dimensioned to be observable at a distance by a remote visual capture device; an internal gps tracking unit tracking the current position of the target unit; a microcontroller and storage means for storing gps tracking data; and wireless network interconnection unit for interconnecting wirelessly with an external network for the downloading of stored gps tracking data; a power supply for driving the gps tracking unit, microcontroller, storage and wireless network interconnection unit, a user interface including an activation mechanism for activating the internal gps tracking unit to track the current position of the target unit over an extended time frame and store the tracked gps tracking data in the storage means.

12 Claims, 3 Drawing Sheets

(51) Int. Cl.
  *G01C 11/02* (2006.01)
  *G01C 11/00* (2006.01)
  *G01C 21/00* (2006.01)
  *G01C 21/04* (2006.01)

(52) U.S. Cl.
  CPC ........... *G01C 21/005* (2013.01); *G01C 21/04* (2013.01); *G01S 19/421* (2013.01)

(58) Field of Classification Search
  USPC ........................................ 342/357.28, 357.25
  See application file for complete search history.

(56) References Cited

U.S. PATENT DOCUMENTS

| | | | | |
|---|---|---|---|---|
| 8,855,846 B2 * | 10/2014 | Grzywna | ............ | G01C 21/005 |
| | | | | 244/189 |
| 9,213,905 B2 * | 12/2015 | Lange | ................ | G06K 9/00805 |
| 9,429,425 B2 * | 8/2016 | Tillmann | ............ | G01C 11/02 |
| 9,607,219 B2 * | 3/2017 | Greveson et al. | ............................. | |
| | | | | G06K 9/00476 |
| 9,756,293 B2 * | 9/2017 | Coulter | ................. | H04N 7/181 |
| 9,928,659 B2 * | 3/2018 | Dean et al. | ........... | G06T 19/006 |
| 10,220,964 B1 * | 3/2019 | Sperindeo | ............ | H04N 5/2251 |
| 10,311,297 B2 * | 6/2019 | Greveson | ................. | G06K 9/52 |
| 10,387,718 B2 * | 8/2019 | Guerrini et al. | ... | G06K 9/00335 |
| 10,540,782 B2 * | 1/2020 | Benini | ....................... | G06T 7/60 |
| 10,885,328 B2 * | 1/2021 | Greveson | ............. | G06K 9/6215 |
| 10,890,927 B2 * | 1/2021 | Miller | .................. | G05D 1/0038 |
| 2005/0034074 A1 | 2/2005 | Munson et al. | | |
| 2009/0091496 A1 * | 4/2009 | Whitehead | .............. | G01S 19/35 |
| | | | | 342/357.31 |
| 2011/0064312 A1 * | 3/2011 | Janky | ..................... | G01C 15/00 |
| | | | | 382/195 |
| 2012/0237083 A1 | 9/2012 | Lange et al. | | |
| 2014/0257595 A1 | 9/2014 | Tillmann | | |
| 2014/0292570 A1 * | 10/2014 | Wallace | .................. | G01S 19/41 |
| | | | | 342/357.42 |
| 2014/0309864 A1 * | 10/2014 | Ricci | ........................ | A61B 7/04 |
| | | | | 701/36 |
| 2015/0085103 A1 | 3/2015 | Rotvold et al. | | |
| 2015/0254738 A1 * | 9/2015 | Wright, III | ......... | G06K 9/00912 |
| | | | | 705/26.81 |
| 2016/0320951 A1 * | 11/2016 | Ernst et al. | ......... | G06F 3/04842 |
| 2016/0344981 A1 * | 11/2016 | Lunt | ..................... | H04N 7/183 |
| 2018/0329412 A1 * | 11/2018 | Kupervasser | ........ | G05D 1/0088 |
| 2019/0266396 A1 * | 8/2019 | Greveson et al. | ............................. | |
| | | | | G06K 9/00476 |
| 2020/0226352 A1 * | 7/2020 | Coulter | ..................... | G06T 7/37 |

\* cited by examiner

INTEGRATED VISUAL GEO-REFERENCING TARGET UNIT AND METHOD OF OPERATION

FIELD OF THE INVENTION

The present invention is directed to providing a highly accurate, easy to use, automated georeferencing system and method for aerial surveying.

BACKGROUND OF THE INVENTION

Any discussion of the background art throughout the specification should in no way be considered as an admission that such art is widely known or forms part of common general knowledge in the field.

There has been a recent dramatic increase in the ability to collect aerial survey data from satellites, planes and, more recently, inexpensive drones (UAV). The challenge that exists is both turning raw imagery from aerial capture by, for example, a UAV, into valuable surveying and inspection outputs, and also in visualizing and using the information without needing to be technically trained in expensive geospatial or computer aided design software.

The ease of imagery capture has resulted in gigabytes of un-georeferenced imagery being uploaded by users. Unfortunately, in order to accurately georeference this data, it is often necessary to hire a certified surveyor to capture ground control points, in addition to post processing the imagery to locate and identify the capture ground control points. This normally results in a high expense for the provision of good quality georeferenced data.

There is a general need for simple, low cost precision georeferencing without adding expensive and technically complex processing to each customers UAV, and without the customers needing to pay surveyors to reference the data. This would allow UAV surveying of large areas quickly and cheaply.

The value of the aerial survey is dependent on the accuracy of the data, and the specific challenge with aerial surveying is to properly georeference (scale and locate with a global reference) the data. Currently, georeferencing is normally performed in two ways.

1. The data can be geotagged at capture on the aircraft. This is usually performed using high accuracy, kinematic GPS units that attach location information to the captured data. Though the option for lower cost, lower quality GPS units exists, accuracies are often limited to +/−2 m.

2. The other, more common method of georeferencing the data is with ground control points (GCPs). GCPs are placed on the ground which are clearly identifiable from the aircraft (typically spray paint crosshair or natural features), and those points are then surveyed manually. Whilst these markings tend to be semi-permanent and to be useful across multiple surveys, care must be taken to place them outside heavily trafficked areas.

Unfortunately, both methods have significant drawbacks. Geotagging the data at the time of capture relies on precision equipment because a) the aircraft is moving, and the GPS timestamp must be synced perfectly to when the shutter is open; and b) errors in the capture equipment, namely aberrations in the camera lens cannot be accounted for, instead they are projected through the results, and this precision equipment is expensive and difficult to operate preventing widespread use.

Surveyed targets are less technically complex, and minimise errors most conclusively, but require a surveyor and high end GPS equipment on the ground to capture the location of the target. This adds significantly to the expense, but this is a very common method.

The advent of remotely piloted aerial systems (RPAS, or drones) has the potential to significantly bring down the price of aerial surveying. The key to the usefulness of a RPAS and the data that can be collected is its accuracy, and that suffers from the same problem as traditional aerial surveying, georeferencing.

It would be desirable to provide a low cost method of solving the georeferencing issue.

SUMMARY OF THE INVENTION

In accordance with a first aspect of the present invention, there is provided a georeferencing target unit including: a generally planar top surface including a visual marker structure on the top surface, dimensioned to be observable at a distance by a remote visual capture device; an internal gps tracking unit tracking the current position of the target unit; a microcontroller and storage means for storing gps tracking data; and a wireless network interconnection unit for interconnecting wirelessly with an external network for the downloading of stored gps tracking data; a power supply for driving the gps tracking unit, microcontroller, storage and wireless network interconnection unit and a user interface including an activation mechanism for activating the internal gps tracking unit to track the current position of the target unit over an extended time frame and store the tracked gps tracking data in the storage means.

In some embodiments, the georeferencing unit activates the wireless network interconnection unit to upload the stored tracked gps tracking data to an external storage device once the georeferencing unit can be in contact range of a wireless network.

In some embodiments, the unit further includes a solar cell charging unit for charging the power supply. The solar charging unit can be included in the visual marker structure on the generally planar top surface. The unit can be generally stackable with other units. The unit can be of a substantially planar structure.

The system can further include an external processing unit adapted to combine the tracked gps tracking data with imagery captured substantially simultaneously by a remote visual tracking device, including imagery of the visual marker structure, and to process the imagery to determine a georeferenced version of the imagery.

BRIEF DESCRIPTION OF THE DRAWINGS

Embodiments of the invention will now be described, by way of example only, with reference to the accompanying drawings in which.

REFERENCES

Figure 1:
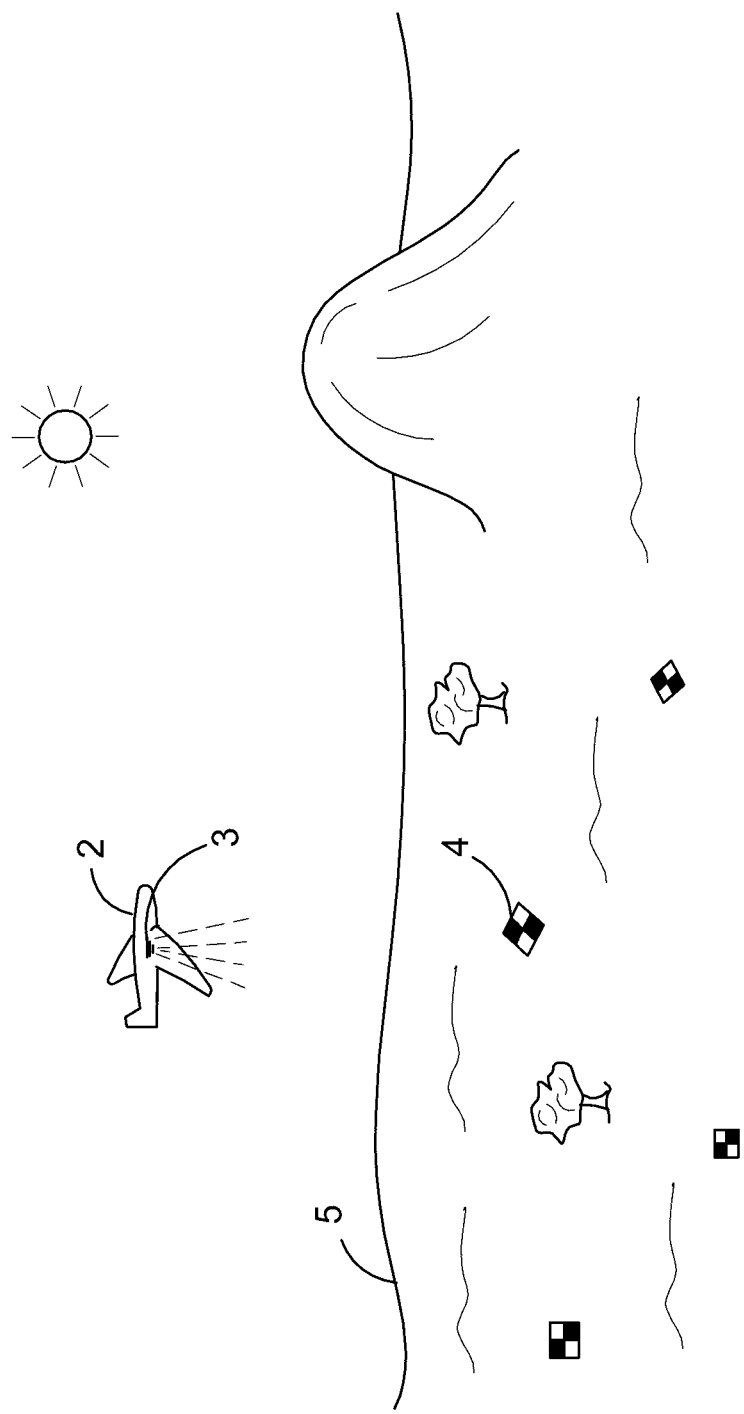
FIG. 1 illustrates schematically the operational environment of the preferred embodiment.

Dennis Odijk; Peter J. G. Teunissen; and Baocheng Zhang (2012), Single-Frequency Integer Ambiguity Resolution Enabled GPS Precise Point Positioning Stempfhuber, W., & Buchholz, M. (2011). A precise, low-cost RTK GNSS system for UAV applications. International Archives of the Photogrammetry, Remote Sensing and Spatial Information Sciences, 38, 1-C22.

Takasu, T., & Yasuda, A. (2008). Evaluation of RTK-GPS performance with low-cost single-frequency GPS receivers. In International symposium on GPS/GNSS (pp. 1114)

English, A., Ball, D., Ross, P., Upcroft, B., Wyeth, G., & Corke, P. (2013). Low cost localisation for agricultural robotics. In Proceedings of the 2013 Australasian Conference on Robotics & Automation (pp. 1-8). Australian Robotics & Automation Association.

Rizos, C., Janssen, V., Roberts, C., & Grinter, T. (2012). Precise Point Positioning: Is the era of differential GNSS positioning drawing to an end?

BĂDESCU, G., ŞTEFAN, O., BĂDESCU, R., & ORTELECAN, M. (2011). Positioning System GPS and RTK VRS Type, Using The Internet as a Base, A Network Of Multiple Stations.

Dennis Odijk, Peter J. G. Teunissen, and Amir Khodabandeh. (2014). Single-Frequency PPP-RTK:

Janssen, V and Haasdyk, J (2011) Assessment of Network RTK performance using CORSnet-NSW. In: Proceedings of IGNSS 2011 Symposium, 15-17 Nov. 2011, Sydney, Australia.

Takasu, T., & Yasuda, A. (2009, November). Development of the low-cost RTK-GPS receiver with an open source program package RTKLIB. In International Symposium on GPS/GNSS (pp. 4-6). Jeju, Korea: International Convention Centre.

Yun, B., Peng, K., & Chen, B. M. (2007, May). Enhancement of GPS signals for automatic control of a UAV helicopter system. In Control and Automation, 2007. ICCA 2007. IEEE International Conference on (pp. 1185-1189). IEEE.

ANDREI, C. O., Vermeer, M., Kuusniemi, H., & Koivula, H. (2011). Evaluation of Absolute and Relative Carrier Phase Positioning using Observations from Navigation-Grade u-Blox 6T Receiver. In Proceedings of 3rd International Colloquium on Scientific and Fundamental Aspects of the Galileo Programme.

Salazar, D., Hernandez-Pajares, M., Juan-Zornoza, J. M., Sanz-Subirana, J., & Aragon-Angel, A. (2011). EVA: GPS-based extended velocity and acceleration determination. Journal of Geodesy, 85(6), 329-340.

Gleason, Scott, and Demoz Gebre-Egziabher, eds. GNSS applications and methods. Artech House, 2009

Hegarty, Christopher J., and Eric Chatre. "Evolution of the global navigation satellite system (gnss)." Proceedings of the IEEE 96.12 (2008): 1902-1917.

Misra, Pratap, and Per Enge. Global Positioning System: Signals, Measurements and Performance Second Edition. Lincoln, Mass.: Ganga-Jamuna Press, 2006.

Kaplan, Elliott, and Christopher Hegarty, eds. Understanding GPS: principles and applications. Artech house, 2005

Ahmed El-Mowafy (2012). Precise Real-Time Positioning Using Network RTK, Global Navigation Satellite Systems: Signal, Theory and Applications, Prof. Shuanggen Jin (Ed.)

Chen, K. (2004). Real-Time Precise Point Positioning and Its Potential Applications. Proceedings of ION GNSS 2004, Long Beach, Calif., Sep. 21-24, 2004.

Chen, K. and Gao, Y. (2005). Real-Time Precise Point Positioning Using Single Frequency Data", Proceedings of ION GNSS 2005, Long Beach, Calif., Sep. 13-16, 2005.

Gao, Y. and Shen, X. (2002). A New Method for Carrier Phase Based Precise Point Positioning, Navigation, Journal of the Institute of Navigation, Vol. 49, No. 2.

Gao, Y., Wojciechowski, A. And Chen, K. (2005). Airborne Kinematic Positioning Using Precise Point Positioning Methodology", Geomatica, Vol. 59, No. 1.

Heroux, P., Gao, Y., Kouba, J., Lahaye, F., Mireault, Y., Collins, P., Macleod, K., Tetreault, P. and Chen, K. (2004), Products and Applications for Precise Point Positioning—Moving Towards Real-Time. Proceedings of ION GNSS 2004, Long Beach, Calif., Sep. 21-24, 2004.

Muellerschoen, R. J., Bertiger, W. I. and Lough, M. F. (2000). Results of an InternetBased Dual-Frequency Global Differential GPS System, Proceedings of IAIN World Congress, San Diego, Calif., June 2000

Dimitrios Ioannoua, Walter Hudab, Andrew F. Lainec "Circle recognition through a 2D Hough Transform and radius histogramming" 1998

DETAILED DESCRIPTION

The preferred embodiment provides a low cost, easy to use positioning devices to provide highly accurate and largely automated georeferencing for aerial surveying. Most significantly, consumer grade, single frequency GPS receivers and antennas can be used to provide data accuracies comparable to geodetic grade units. Until now, unlocking the positioning precision in this low cost equipment meant individuals were required to both purchase an expensive RTK subscription and understand the logic and theory behind the post processing software RTKLIB. The preferred embodiments provide a simplified system of the user placing a rugged target unit out in the sun for two hours then turning on their phone hotspot. The user needs to know nothing about the underlying technology and is now able to produce survey grade datasets, without the effort or expense of sub-contracting traditional surveyors to capture GCPs.

UAV Surveying:

UAV surveying is typically conducted on sites ranging from 5 to 1000 hectares. Often, it tends to be more cost effective to employ a manned aerial survey for areas >1000Ha. The operator will instruct the UAV to fly in a grid style flight path over the area to be surveyed, and a camera pointing directly at the ground (NADIR) will take photos at set intervals.

Turning initially to FIG. 1, it is assumed that the UAV survey of the preferred embodiment is carried out utilising an automated fixed wing drone 2 carrying a capture camera 3. An example of a suitable drone product is the eBee fixed wing drone from Sensefly. The drone is programmed to fly over a predetermined area 5 over which a series of tracking mat devices e.g. 4 have been placed at a substantially constant dispersion pattern. For example, every 50 meters, in a grid pattern.

Current best practice to georeferenced this data is to place a GCP every 40 Ha, (that is, a 500 ha site will need 12) to tie down the model accurately. In prior art systems, the surveyor normally walks across the site and paint markers on the ground (evenly distributed) and then take a GPS snapshot of each target. Employing a surveyor to place ~12 GCPs on a site typically takes about 12 person hours and costs about AU$1500. With a full set of NADIR photos and the coordinates of the markers, the next step is to use a photogrammetry software package to align the photos. Airsoft Photoscan Professional is a suitable commercial software program used to generate the data outputs from the survey.

In the prior art, the operator must then input the GCP coordinates into the software then manually tag the photos which have a visible GCP. This is a time consuming and error prone process, yet critical to obtaining accurate results from the surveying process. Whilst this problem applies across both manned aerial surveying, unmanned aerial surveying and other types of aerial data capture, the embodiments focus on the specific needs of unmanned aerial surveying. The target functionality of the first embodiment is summarised below:

Cost Effective, Survey Grade GPS Data:

The target mat device e.g. 4 uses a positioning technique called Precise Point Positioning (PPP) to capture its location accurately. This method requires only a standalone receiver and antenna (unlike kinematic systems which require a real time correction stream) to obtain a very accurate fix, however, the method suffers from long convergence times needed to resolve ambiguities. Because of these long convergence times, and with the widespread availability of correction networks and RTK providing <2 cm absolute positioning error, the technique [PPP] is often little used.

This target mat device benefits from exactly the drawback that makes PPP unfeasible in other applications. Because aerial surveys typically take some time to complete (>~2 hr), the device has the opportunity to cancel errors over that period of time and eventually report back an accurate target positioning.

PPP relies on knowing the precise satellite motions to process the raw data into a survey grade fix. The precise satellite motions are computed by the IGS and results are published every 3 hours. Combining this accurate positioning data with the raw GPS log happens after the survey and leads to the accurate position.

In the event that PPP based positioning does not provide an accurate enough solution, the target mat device has a fallback of using publicly available correction streams from a network of CORS receivers. The functionality of the device does not need to change, as the raw log files can be processed into RTK or PPP solutions after the fact, with no noticeable usability difference to the customer.

Single Frequency:

Survey grade GPS equipment usually operates across the L1 and L2 GPS frequencies to bring the speed of a fix down to minutes. This naturally results in a high added expense. In the first embodiment, it is assumed a significant time frame for data collection. Because of the time available to collect data, the target mat device works on L1 alone, bringing the cost down significantly (a L1 raw output receiver and antenna can be bought for <$100)

Inexpensive, Lightweight, Zero Configuration:

The target mat device needs to be big enough to be spotted from above, Therefore a diameter of ~60 cm is ideal. That is the only physical constraint. The electronics contained inside are small and light, consisting of a basic single board computer, the GPS receiver/antenna, a small modem to communicate its position and a battery.

Solar Powered:

The low power budget of the device and expected operating conditions are ideal conditions for solar power. The example panel will need to output ~500 mw at 5V Visually Unique Targets:

Collecting the accurate GPS data is the first part of the problem. The locations of the targets must be integrated into the processing of the data to remove the current need of an operator identifying the targets in the images. The ground control targets are therefore are ideally uniquely coloured and pattered with high contrast such that the system can automatically detect locations of the targets in the photos. Computer vision techniques are then used to identify and match the known patterns to those appearing in the images, and then exporting the x and y pixel values of the centroids of the targets from those photos to the stitching software to close the loop and automate the entire process.

Hardware:

The only interfaces on the target mat device are a button and a LED to help the operator understand the current status of the device. The device is waterproof and dustproof (sealed) for all weather and harsh environment usage. The device stacks on itself for convenient transportation. The device design can allow for a number unique combinations of pattern and colour.

Single Base Real Time Kinematic (RTK):

GPS has been fully operational since 1995, delivering coarse (~15 m) location accuracies to the general public. To improve the precision of the output, the errors need to be quantified and cancelled. The most significant error is the unpredictable delay of the signals through the ionosphere. Because the significance of the ionosphere error is correlated to the signal frequency, satellites broadcast at least 2 frequencies, and the error delta can be resolved locally. Without multiple frequencies, the only way to perform real time ionospheric correction is to have a network stream transmitting the error then cancelled locally. This is the basis of RTK. RTK uses the carrier frequency of the signal to synchronize rather than the location data encoded in the course acquisition data encoded in the signal. This decreases the bit width of the signal significantly, but opens up a new issue, integer ambiguity: is the receiver in sync with the wavelength or some multiple off (19 cm each time). L1 and L2 receivers are able to resolve this ambiguity easily, but it takes much longer on L1 alone and is done statistically using the intersection of data from at least 5 satellites. The first embodiment utilises the understanding that single frequency, L1 RTK is possible with the right conditions.

As stated in "Assessment of Network RTK Performance using CORSnet-NSW" (Volker Janssen and Joel Haasdyk, 2011), because the corrections are derived from a single base station and the corrections that model the offset between the observed and corrected rover position, positioning quality decreases as the baseline distance increases. Despite a baseline length of 20 km being accepted as the maximum allowable distance between rover and base to perform accurate RTK measurements, in times of low ionospheric activity acceptable results can be generated with distances up to 50 km (Volker Janssen, 2011). Despite this, covering a large area would require hundreds of base stations and become prohibitively expensive.

Precise Point Positioning:

Precise Point Positioning is the technique based on the GPS carrier phase and code observations from a single receiver, and then combining the data with post processed satellite clock and orbit data to reverse calculate the ionosphere errors corresponding to that location. This allows PPP to achieve similar accuracies despite not having the real time local ability to cancel the error from dual frequency or the network stream of correction data. This essentially makes PPP totally standalone (although there is a NASA network offering corrections that apply globally, it is sufficiently abstracted from the end user that it can be called "standalone"). NASA release the satellite orbit and clock information every 6 hours, and precision of the data is revised every 6 hours until 24 hrs after the time of interest, where the NASA errors have converged and the data is most accurate. This method can be the basis for an application where the receivers have the ability to collect stationary data for an extended period of time, and post processing of the data is carried out with the most accurate NASA data available.

The option exists to reprocess once NASA releases more accurate clock and position data, further reducing errors in the initial PPP based location.

The substantial difference in quality offered by the IGS, with real time solutions suffering from errors exceeding a decimeter level. The system of the preferred embodiment utilises long measurement cycles in a post (rather than real time) processed fashion allowing the use of highly accurate clock and orbit data.

In "Performance Analysis of Precise Point Positioning Using Real-Time Orbit and Clock Products" (Gao and Chen, 2004), while doing static control surveys using dual frequency equipment in PPP mode, coordinate estimates converged to a cm level within 20 minutes. After convergence, all components of the result were accurate to sub-cm level. These results are in line with other research, all determining that in static applications PPP can deliver sub centimeter results (Zumberge et al., 1997, Heroux et al., 2004 Gao et al., 2005).

Whilst this doesn't address single frequency and low cost equipment, this result must be taken with some significance. In just 20 minutes PPP based results on dual frequency equipment can better RTK based results. The first embodiment provides an opportunity for determining the single frequency accuracy penalty yet solving the problem regardless using some fallback opportunities.

Network RTK:

In some embodiments, Network RTK can be used. Network RTK extends the capability of single reference RTK by intelligently modelling atmospheric errors using the nearest 3-6 base station and generating a virtual reference station with a zero baseline distance from the roving GPS unit. As stated above, single base RTK has useable radius of ~20 km from the correction source, and in an attempt to lower the price point and infrastructure requirements network RTK was developed to provide useable baseline length of up to 100 km (Ahmed El-Mowafy, 2012).

Network RTK also adds redundancy to an otherwise single point of failure positioning method. Because the computed correction information is comprised of a mesh of receivers, if one was to fail there is still opportunity to accurately process GPS data. There is no limit on the size of these mesh networks, although to quickly resolve atmospheric ambiguities, node spacing is generally <100 km. Adding more nodes both adds redundancy and improves the modelled errors improving accuracy (El-Mowafy et al., 2003, Hu et al., 2003).

Node spacing in network RTK is generally capped at 100 km, because, while it is possible to design networks with larger spacing, the risk of incorrectly resolving integer ambiguities increases significantly. The next generation of triple frequency positioning equipment is expected to increase functional node spacing to 140-180 km, while still maintaining positioning accuracy in the 2 cm range (Feng and Li, 2008).

In "Assessment of Network RTK Performance using CORSnet-NSW" (Volker Janssen and Joel Haasdyk, 2011), GPS performance is measured using geodetic quality GPS units running on both L1 and L2 frequencies.

PPP+RTK:

Critical to the effectiveness of RTK is the baseline length between the ground station and the roving receiver. It is commonly accepted that the correction stream becomes less accurate when the distance from the target is greater than 20 kms (Zhang et al., 2006), thus the success of RTK is dependent on a reliable mesh of ground stations covering a large area. PPP does not require the localized ionosphere correction error stream so is not dependent on local hardware, however convergence times are significantly longer, requiring sometimes hours to collect enough data. Recently, there has been developments in network assisted PPP, or PPP RTK. This technique uses the baseline tolerant PPP methods combined with the network based, real time clocks and orbit data to generate precise results without the expensive survey grade equipment.

Significantly, according to "Single-Frequency PPP-RTK: Theory and Experimental Results" (Dennis Odijk, Peter J. G. Teunissen, and Amir Khodabandeh, 2014), both low cost single frequency and geodetic receivers can generate cm level PPP with less than 10 minutes of observation time plus network corrections.

The biggest technical challenge in the first embodiment is the total absolute error of a post processed GPS signal over the course of a survey (say 2 hrs). This will be determined by the conditions during capture and the quality of the receiver and antenna. Further algorithmic refinements tricks can be implemented to better guess the absolute position of the marker.

More important than absolute accuracy of the survey is the internal consistency of the data, or relative accuracy. This determines the scale of the data, and is significant to any measurements coming from the data. The combination of PPP and RTK positioning techniques allow for very good internal consistency data coming from the targets.

By computing all the logs separately using the orbit and clocks data from NASA, it is possible to generate position and RINEX data for each target. The next step is to intelligently decide which target had the strongest signal strengths from the most satellites (a strong indicator of lock accuracy). That target becomes the "parent" target, and we process the other targets in PPP-RTK mode using the parent as the base station.

This takes advantage of the fact that atmospheric errors are likely consistent in areas within a 10 km radius from the parent. Once the PPP position of the parent is determined, any fluctuations in the signal are assumed to be errors, and those errors are presented to the "children" targets and become cancelled out immediately.

This is identical to how traditional RTK GPS works, and because of the hyperlocal correction feed, one can expect relative errors <2 cm internally. That is, taking one target as the origin, all other targets can have their position measured relative to the origin to within 20 mm. The internal consistency/scale is far better than required.

Throughout most of the developed world there exists RTK augmentation services designed to stream a similar correction stream to local GPS rovers seeking accurate positioning. In the event that the initial PPP lock is too ambiguous and does not satisfy the accuracy requirements, the option exists to subscribe to one of these services to post process the logs with a formal correction source. One can expect RTK GPS locks to only require 15 minutes of data (minimum amount of time for L1 to resolve atmospheric ambiguities).

Important to the first embodiment is the maximum practical accuracy of L1 only PPP GPS data, so all attempts can be made to optimize and quantify this before falling back onto single base RTK.

Traditional RTK, whilst having well understood accuracy advantages over PPP data, suffers from a lack of redundancy. That is, because the nodes are spaced sparsely around a large area, NSW for example, measurements at a randomly selected location will likely only be in range of a single node. If that node has any downtime, the signal will no longer have the network corrections to apply and accuracy will be reduced to PPP at best. Because these targets are designed to use PPP based positioning to derive position, and that this, as well as the UAV survey itself requires generally more than 2 hours, there is the opportunity to use any 15 minute section of data from the targets to derive the accurate position. This gives network base stations at most a 1 hr, 45 min time window to resume regular servicing after some downtime.

Tracking Mat Device

Figure 2:
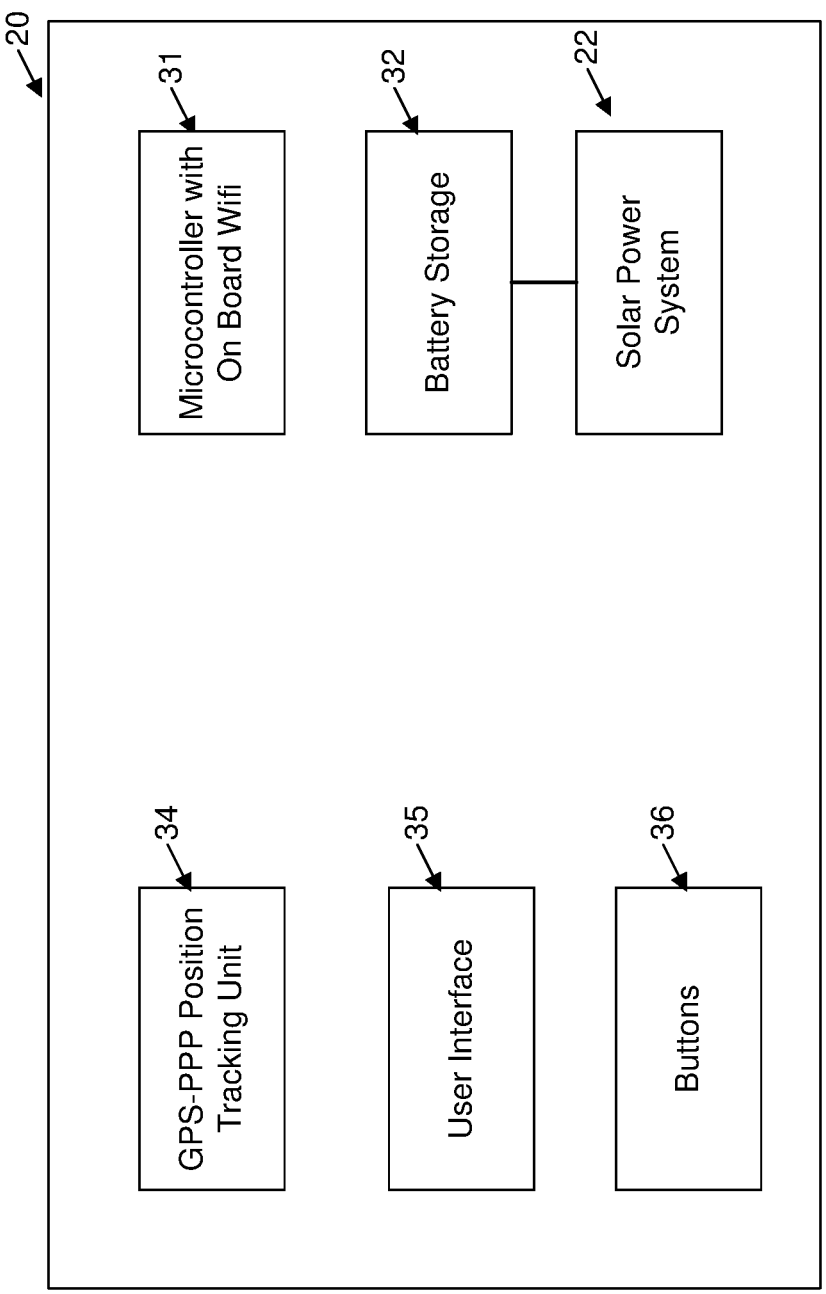
FIG. 2 is a schematic block diagram of the target mat device.
Figure 3:
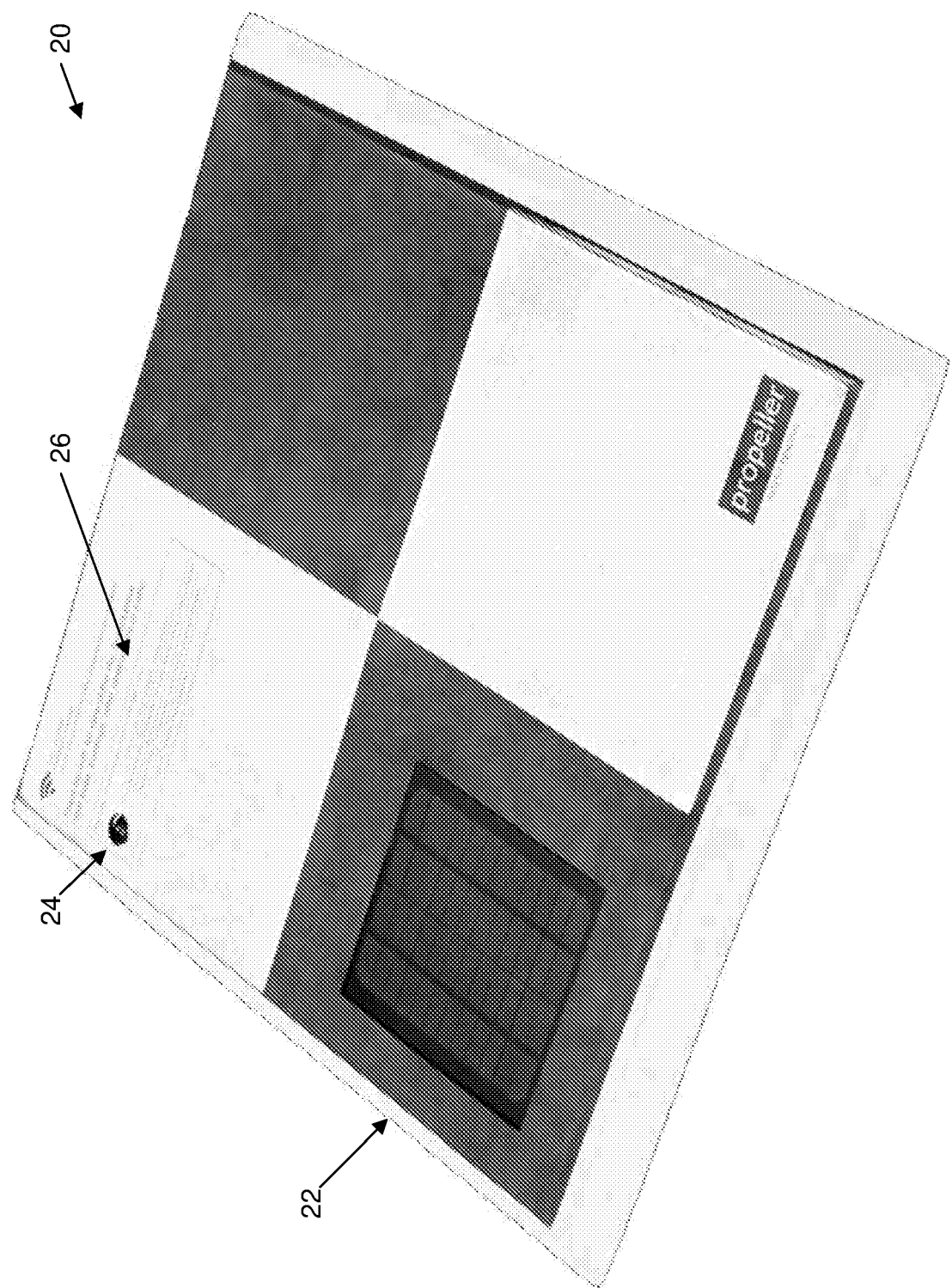
FIG. 3 is a side perspective view of one form of target mat device.

FIG. 2 illustrates schematically, one form 20 of the tracking mat device, whilst FIG. 3 illustrates a side perspective view of the tracking mat device.

The tracking mat device 20 must be relatively lightweight, however not too light such that it blows away in a breeze, large enough to be clearly seen in photos taken from 120 m altitude, weather resistant (water and dirt), tolerant of rough handling and safely protect the internal components from damage.

The tracking mat device can be formed from many different materials. For example, a molded plastic skin, with depressions for the electronics and a printed surface on the top face to allow for visual identification. The design is preferably easily stackable. In one form, EVA foam is a suitable material for the mats. A closed cell foam can be waterproof, lightweight, flexible and offer a degree of cushion for the fragile electronics inside. EVA foam is a particularly hard wearing closed cell foam used in padded flooring product. Compared to polystyrene, EVA has a high density of 200 kg/m3 and is flexible whilst still retaining original shape. Furthermore, EVA foam is often packaged and sold as 600×600 mm floor tiles. EVA is easy to cut, is importantly "radio transparent", as with all foams. Thus 12 mm thick EVA foam tiles can provide one structure of the device and the electronics would be sandwiched inside. The thickness of the device is important as the operator will be carrying 12 of these units and total volumetric properties need to be minimized.

Visual Target:

Important to the success of the device 20 is the automatic visual identification of the unique mats and accurate center point detection. In one embodiment, as shown in FIG. 3, a high contrast checkerboard pattern was formed on the external surface. The considerations that needed to be accounted for are as follows: A design clearly visible from the sky, that is, features must be large, Non-reflective: under bright sunlight the patterns must be still visible. Of course, many other surface patterns could be used. The printed material must be tough enough to survive out in the field for extended periods of time, and be both low reflectivity and low cost.

In some embodiments, the printed top pattern can be used. A commonly used, inexpensive, polymer based paper replacement called Tyvek has been used in similar uses since it is a waterproof, breathable, printable and extremely tough material. This was determined as one suitable solution. Furthermore, the polymer and print was very low reflection and almost entirely rip proof, ideal characteristics for the visual targets.

Internal Electronics:

The device 20 operates as a Wi-Fi enabled GPS logger. The two functions of the device are to log GPS data for a predetermined amount of time and then to upload that data to a server. The subsystems included are illustrated in FIG. 2 and include the following: a microcontroller with WiFi connectivity 31, a power system, including battery 32, solar panel 22 and requisite voltage conversion circuitry (not shown). A GPS unit 34, a user display 35 and interface buttons 36. The electronic subsystems work together to provide a low cost, easy to use and highly accurate positioning data for aerial surveying.

Microcontroller 31:

The microcontroller is required to control the basic operation of the device, including the human interface, the GPS logging and the internet connectivity. This can include a single board computer running Linux to allow full flexibility in the code, to allow remote firmware updates and to allow onboard PPP GPS processing. One example was the Raspberry Pi, running Debian. This device successfully recorded GPS data to a log file and uploaded the file to a server over an Ethernet connection. The Raspberry Pi also fits inside the budget at ~$30 AUD per device.

Ideally, components with low/optimized power consumption was critical to the success of the device. Thus we used the lowest power equipment possible. Unfortunately, the idle and active power consumption of the RPi meant the device is not readily suitable for any embedded, battery powered applications. There are suitable devices to consider however, listed below with relevant specifications:

| Name | Price | OS | Power - active | Power - standby | WiFi built in | GPIO |
|---|---|---|---|---|---|---|
| Spark Photon | $19 | Photon OS - similar to arduino | 150 mA | 10 mA | Yes | Yes |
| RPi B+ | $35 | Ubuntu | 500 mA | 30 mA | No | Yes |
| WiFiG25 | $29 | Buildroot - minimal linux | 300 mA | 10 mA | Yes | No |
| ESP8266 | $13 | NodeMCU - Arduino | 150 mA | 76 uA | Yes | Yes |

For reasons of price, power consumption and ease of coding one suitable device is the ESP8266 WiFi module, and instead of pairing with an Arduino or similar microcontroller, it can be programmed using the released SDK which allows programming of the onboard 32 bit CPU in Arduino, wiring style C. This greatly simplifies the hardware components required, as well as makes for simple programming and low power consumption when in a) logging state, b) WiFi uploading state and c) deep sleep state. Furthermore, the ESP8266 has 16 GPIO pins to use as either inputs or outputs, and thus we are able to control the on/off state of the GPS unit, and status LEDs for usability.

There are some particular issues with the ESP8266 device that were encountered in practice. These are that a) the onboard flash storage may not be enough for the GPS logs, b) the deep sleep power consumption can vary and c) each time the device wakes up it resets memory entirely. To combat the low internal storage capacity, a microSD card slot with 4 GB capacity was added providing enough space for 750 individual logs before requiring uploading—far more than required. The expected usage pattern is that immediately after logging the data and the survey completing, the logs will be uploaded. There is the option that the operator will want to perform multiple surveys out in the field before returning to upload, and that will also be possible given the amount of storage capacity.

The ESP8266 normally has three modes of operation, on with WiFi, On without WiFi and deep sleep. Unfortunately the only way to switch between these modes of operation is to reset the device with a wakeup command specifying which mode of operation to boot in. Because the device holds no state information between boots it is very hard to switch between modes. The code written to counter this issue takes advantage of the added storage capacity. A small state keeping file is written to the SD card and which keeps track of the mode of the device. This file is checked on boot up and the logic decides which mode to enter subsequently. Advantages to doing this are that the on button is able to trigger the reset of the device rather than acting as an interrupt, meaning the user is always able to reset operation in case of brown/black out of the device. The method has no dependency on storing usage variables in volatile memory, a redundancy feature for a device which must operate in potentially less than friendly conditions.

Power System 32, 22:

As previously stated, the absolute and relative accuracy of the device are not the only concerns, and as such we must design the device to be intuitive and hassle free. A major function is the supply of electricity to the device while out in the field and then give the device enough power to poll for WiFi and transmit the data back to the server.

The device can be powered using solar electricity and thus added that to the system. The final power system consisted of a 3500 mAh, 3.7V Lithium Ion 18650 cell, connected to a DC-DC step up voltage converter. There is a 3 W solar panel connected to a solar charge controller to allow the target to take advantage of its use during the day. To protect and extend the service life of the battery, there is a protection circuit onboard which cuts out power when the voltage of the battery reaches a minimum or maximum threshold. The initial power budget was thought to be as follows:

| Part | Power while idle | Power when in use |
| --- | --- | --- |
| ESP8266 (and related components) | 52.4 mA | 145 mA |
| M8T GPS | 0 mA (FET controlled) | 64 mA |
| Total | 52.4 mA (200 mW @ 4 V) | 209 mA (836 mW @ 4 V) |

Considering the maximum power draw is <1 W when logging from the GPS, the 3 W panel is designed to power and recharge for the extended periods of logging out in the sun. The capacity of the battery is larger than required: the device lasts for 10 hours when continuously logging, or longer if looking for WiFi or uploading. Furthermore, the solar panel is larger than required, but both decisions are based around real world testing and experience.

GPS Unit:

Selecting an appropriate GPS antenna and receiver is challenging even before pricing. It is important to consider the operating conditions when choosing the equipment, as some of the more expensive antennas offer features and performance not required in this application. That is, because these units will be operating in near ideal conditions, middle of the day and with clear view of the sky (so the photos from the drone clearly show the targets), and in areas with low or no building one can expect close to nil multipath reception issues. Multipath interference is when signals are detected by the antenna after reflection off a large vertical surface like a building, as well as directly from the satellite. This degrades the quality of the solution significantly and is a problem which is handled significantly better by more expensive units.

It is commonly believed to achieve a strong RTK fix position you must have visibility to 6 satellites all with signal strength above 30 dB (Andrei, Vermeer1, Kuusniemi2, Koivula2, 2011), thus there is a threshold quality level to benchmark antenna and receiver performance against. Considering multipath issues would be minimal, the decision was made to favor antenna gain to push up the signal strength of the inbound signal. A number of units were tested:

| Name | Price AUD | Sensitivity | Refresh Rate |
| --- | --- | --- | --- |
| Ublox M8T | $70 | −167 dBm | 10 Hz |
| Ublox 6T | $50 | −162 dBm | 1 Hz |
| Navspark NS-RAW | $80 | −165 dBm | 20 Hz |

The CSGShop made u-Blox M8T+Taoglas 35 mm antenna on ground plane provided extremely good data with signal strengths regularly reaching 40 dB and consistent satellite locks tracking motion through the sky. Furthermore, at a unit price of just $80 USD it was cheaper than a) the original receivers used and b) cheaper than the antenna alone of what people recommend to process single frequency raw GPS data into accurate RTK or PPP results.

The device uses a software package U-center to be configured. U-center allows you to configure basics like serial baud rates but also specify which of the possible messages the GPS is required to output. The carrier phase and coarse acquisition signals that allow a much more accurate position are output. The M8T allows outputting of RAWX and SFRBX binary data, an upgrade on previous RAW and SFRB data to allow multiple constellations. As well as this the GPS time signal must be reported.

User Interface:

The mission of the interface is to allow users to turn on the device, and control the mode of the device. The modes of operation were quickly simplified down to just 2. Logging and uploading. In logging mode, the GPS unit was powered and the unit would record data for a predetermined amount of time (2 hrs), then automatically change mode. The second mode is designed to upload the logged data to the server. The GPS unit is powered down in this state and the WiFi radio is powered on. Data will be uploaded to the server then the device will shut down (deep sleep) automatically. Considering the usage patterns of middle of the day in sunlight with dirt and dust, a single button and a single LED to inform the user and give control was provided. Of course other interfaces can be provided.

The button is wired up to the reset pin on the board, and some persistent code determines the previous state and boots in the other. That is, if the button is pressed and the last state was uploading, it will boot into logging, and vice versa. Thus the button is a switch, and can be pressed at any time. The LED informs the operator about the state with some simple flashing, solid or off patterns. When the device boots for the first time it will flash 3 times and then go solid, signifying uploading mode. The LED will remain solid for the entire 2 hr period. When the logging has finished, the device will move into uploading mode and the led will begin to flash slowly, indefinitely, looking for WiFi. Upon successful connection to the server and while the file is being uploaded the LED will blink quickly (5 times per second) to notify the user to not interrupt or disconnect the connection. When the file has finished uploading, the device will go into deep sleep and shutdown, the LED will turn off. The device is then ready to log again, simply by pressing the button and watching the LED flash three times. The switch and LED are IP67 rated for water and dust resistance.

As shown in FIG. 3, printed on the patterned design is an infographic explaining the flashing modes for new users, and also detailing the predefined WiFi SSID and password for successful connections.

Software:

ESP8266: Embedded Programming:

The ESP8266 provides a serial WiFi adapter for other microcontrollers like Arduino. There is a small microcontroller onboard, and that is was more powerful and capable than the AVR 8 bit microcontrollers, and so work began building an SDK to program it, and hardware breakout boards to give access to the GPIO pins. The Wiring version of C designed for Arduino was ported and provided the most diverse and mature set of existing libraries to program with, as well as one click compiling and uploading through the existing Arduino development environment (IDE). The wiring version of C is a simple low level scripting language, and considering the main purpose of the ESP is to log then upload, this reliable and low level code is well suited. On boot the device will look for the state file on the SD card to initiate into the correct function. If no file exists, one will be created and device will enter logging mode.

While in logging mode, the device creates a new blank file named on a numbered pattern after the last file that exists. After a 1 minute timeout (designed to give the operator a chance to place the device), raw bits are passed at 9600 baud straight to the SD card. There is no interpretation on the device, all GPS processing is completed server-side. 2 hours later the device will flag the file as ready to upload and begin searching every 10 seconds for a predetermined WiFi network. Upon connecting, a connection to a predetermined API server is initiated, and from then the device is handed a unique URL to upload to Amazon S3. If file completes, server sends an acknowledgement and the file is deleted off the local device.

Post Processing:

The development environment is assumed to be Ubuntu 15.04 LTS. Software used to process GPS data is called RTKLIB and is open source. The devices first tell the API they will be uploading a file. The API builds a unique URL and sends it back to device, allowing the device to upload directly to a secure S3 bucket. On completion, the device tells the API it has finished. The device deletes the file and the API marks the database entry as valid and records the saved file location for recovery. The GPS data is broken down by group, or owner, and then inside that directory are dated folders. All data from one set of targets is stored in one folder, with the unique device ID appended to the filename to make sure no overwriting happens.

The post processing steps are highly automatable. As a proof of concept, the following steps were conducted on each of the text data files.

1. The three message types recorded by the GPS, TIME, SFRBX and RAWX are critical to successful processing. The first step is to process this data into the RINEX format, which normalizes for time and device, and allows interoperability with existing correction data. This generates an observation file and a navigation file in RINEX format.

2. To successfully post process in PPP mode, the user must download the latest clock and satellite positions file, which is compiled by the NASA Jet Propulsion Lab using sensor data taken directly off the satellites (after the fact). This file can be found at https://igscb.jpl.nasa.gov/components/prods_cb.html.

Important to the success of the processing is the configuration file used to determine operating modes of RTKLIB. Separate configurations exist for kinematic and PPP static processing applications. The RTKLIB command can be as follows: ./rnx2rtkp-o examplebase.pos-p 7 -k 243static.conf examplebase.obs igu18643_18.sp3 examplebase.nav This command generates a .pos (position) file with the output of the GPS processing software, and will show an improving position fix over time.

The static function generates PPP based positioning data, while the kinematic configuration file generates the position of one device using the aforementioned PPP processed device as the base station. As the PPP result is always moving slightly, the kinematic configuration takes the average of positions in the base file to use as a reference station antenna location, and then processes the proceeding log using the error correction provided by using a base station of known location. As stated earlier, the expected internal accuracy of this data will be far better than commercial equipment because of the hyper local base station and large time samples to process across. The RTK processing command is as follows: ./rnx2rtkp -o kinematicsample.pos -k 243kinematic.conf samplerover.obs samplebase.obs igu18643_18.sp3 samplebase.nav In this case, kinematicsample.pos will be the generated and represent the location of the samplerover compared to the samplebase, using the averaged PPP result as the origin.

The method of determining the best PPP signal is based on some quantitative GPS indicators, namely, number of satellites, signal strength, and the standard deviation of the solution. After processing all the individual targets the results are assessed. This step is also automatable.

Once the relative RTK solution has been determined the result is considered accurate, as known theory states RTK based solutions like this take 15 minutes to resolve ambiguities however 2 cm accuracies after that.

The last step in the processing chain is to remove the height offset of the surface of the target from the centre of the GPS antenna. The thickness of the EVA foam was 12 mm thus that must be added and the data is ready.

Automatically Detecting Targets:

Detection of targets was carried out in development environment using Ubuntu 15.04 LTS. Software used to process GPS data was called OpenCV and is open source. Python is the language used. The process of dragging points onto the centre of the targets in the photogrammetry processing stack is very time consuming, and the second optimisation to come from these digital ground control points is the automatic recognition of the targets in the photos.

Because the photos are processed server side, there is bandwidth and unlimited time and processing power to accomplish this task. There are some common methods for feature detection in images. The target was designed to avoid false positives and also be large enough to be clear in the images taken by the cameras often used to perform aerial mapping.

The method of detecting objects in the image was the Hough transform. This is very similar to the Hough transform for detecting imperfect instances of objects in images using a voting procedure. The algorithm is essentially a simple way to detect straight lines. It is generally noise tolerant and robust against missing points (Dimitrios Ioannoua, Walter Hudab Andrew F Lainec, 1998).

The output of the Hough transform is both the dimensions and pixel coordinates for the centre of the circle. Using the pixel coordinates, this can be implemented into photogrammetry pipeline and removes the need for manual GCP entry.

Results

The primary hardware requirements are that the device must be lightweight, large enough to be clearly seen in photos taken from 120 m altitude, weather resistant, tolerant of rough handling and safely protect the internal components from damage. Internally, the electronics must be robust, consume small amounts of power, be easy to use and provide accurate positioning data.

Enclosure:

The final enclosure design chosen was two pieces of EVA foam, each 12 mm thick, sandwiching the electronics inside and providing an impact resistant structure to attach the visual target. Regular cyanoacrylate based super glue has been used to fix the mats.

Once the detection strategy was well understood the process of figuring out the best combination and minimum feature size for accurate detection was underway. The success criteria was qualitative and based on imagery captured from two different cameras, one representing high end equipment and one representing low end equipment, and all photos taken from 120 m AGL and with the zoom at its widest setting.

| Camera | Resolution | Sensor Size |
| --- | --- | --- |
| Sony QX1 + 16 mm Pancake lens | 20.1 MP | APS-C |
| Canon S110 | 12.1 MP | 1/1.7 inch |
| GoPro Hero 3+ Black | 12 MP | 1/2.3 inch |

As discussed earlier, the device would always be operated in direct sun, and thus it made sense to consider a solar panel as a way to supplement the higher draw logging state and keep the battery charged.

User Interface:

Many different user interfaces can be considered. As discussed earlier, there were many options considered before coming to a design which we deemed to be simple enough for average operators to understand. The variables in this are the instructions, the button and the led. A small infographic 26 can be added to the surface to the target design to describe the LED blinks, and this formed the instruction component of the mats.

Positioning accuracy: One of the objectives of the preferred embodiment is to provide positioning information which has less than 10 cm error in the LLH axis, as the overarching purpose is to replace the need for expensive surveyors to perform these measurements and achieve a similar quality output.

The CSGShop made u-Blox M8T+Taoglas 35 mm antenna on ground plane was found in test to provided extremely good data with signal strengths regularly reaching 40 dB and consistent satellite locks tracking motion through the sky.

PPP Positioning:

In tests, PPP based positioning information was found to be substantially more accurate than unassisted but still exceeds the allowable decimeter accuracy.

RTK Between Targets:

Whilst the absolute accuracy of the targets (PPP based) is somewhere <1 m, another significant element of aerial surveying is the relative accuracy in the output model, critical for all measurements. That is, even if the model is shifted by up to a meter on a global reference, the relative accuracy between points has the opportunity to be very accurate, which determines the scale of features on the map. This is critical for volumetric applications of the data where the position does not matter as much as the quantity of material measured.

It is worth noting that for RTK positioning to work correctly, you must specify base station coordinates to use as origin of measurement. The concept behind this measurement was to get PPP measurements to determine the best position fix, and use that position fix to base future measurements off.

It was found that the relative accuracies of the position fixes far exceeded that of even high end, survey grade GPS. This means the internal consistency of the resulting model will be accurate to within 2 cm, which is especially critical to volume measurements.

Network Based RTK:

The ability of PPP to be able to provide highly accurate absolute positioning data was the biggest unknown. Network based RTK is the primary method of accurate positioning today, where the rover unit will connect to a local correction service in real time and augment its position to achieve <5 cm accuracies. Traditional rovers each need independent subscriptions to the correction service, which can be very expensive. Using one of the CORSnet base stations with a baseline length of 20 km, processing of target logs provided very low accuracy of relative RTK mixed with the absolute positioning accuracy of the CORSnet base station origin point.

Accuracy Inside Photogrammetry Pipeline:

When using these single base RTK target positions to generate accurate maps and models, similarly accurate results were produced. The internal consistencies of the models are highly accurate: This is a significant result, confirming the RTKLIB generated RTK measurements are accurate compared to each other. Furthermore, the photogrammetry process uses both the built in coarse GPS data embedded in each photo as well as the structure from motion algorithms to rebuild the depth maps and crosscheck accuracies. Thus the results are not alone the internal RTK accuracies between the targets, it is also those targets and their relative accuracies compared to another form of absolute positioning (e.g. photo geotags) and another form of local positioning (SFM). The test which determines the ultimate accuracy of the devices is ironically dependant on traditional GPS based surveying techniques. In this test, the targets are placed in an area, with an equal number of conventional surveyed ground control points scattered around the same area. Both the ground control points and the targets are inputted as ground control in that area, as well as far less weighted camera based geotags and the SFM reconstruction itself.

When compared to existing, survey grade ground control points the average error across the survey in the Latitude, Longitude and Altitude was 0.036518 m, 0.032117 m, 0.034834 m respectively.

Automatic Detection:

The opencv script used to detect the targets uses a Hough transform to find objects in the images between a range of known size. Because we know the size of the targets (60×60 cm) is known and have the camera sensor size, megapixel count and focal length (all in the photo parameter EXIF information) it is possible to estimate the pixel width of the targets on the ground. This can speed up processing significantly and reduce false positives. In tests, both a good quality SLR camera and GoPro on a UAV to determine the suitability of the targets. A size of approximately 60 cm$^2$ was found to be appropriate.

Discussion

Manufacturability:

With high volume, it will be readily evident that other forms of manufacture may be suitable, including injection moulding cases. Electronics testing: Extensive burn in and testing of components should be undertaken. User experience: a single button, single led operation is still attractive. However, other simple interfaces such as LCDs could be provided.

PPP Based Locations:

Despite some theory stating achievable accuracies with single frequency PPP over a multiple hour measurement period, this was not achieved. Further work must go into the viability of the units to perform this, or whether the device simply needed more time to log. Standby battery life: the power system has been over engineered to allow the device to work for extended periods of time. Despite this, the standby power consumption of the device is higher than anticipated due to some circuits which remain powered even after shutdown.

Ease of Iteration on the Printed Targets:

Printed Tyvek target covers reduced the design iteration time dramatically. Quality of positioning information: important to the success, and initially the most ambitious component of this undertaking was the positioning quality ceiling from a low cost, single frequency, consumer grade GPS antenna and receiver. This device when configured correctly and used under ideal conditions delivers results indistinguishable from survey grade, dual frequency RTK GPS units.

Automatic Target Detection:

The target designs matured sufficiently that detection of center coordinates of each target was provided. This directly improves on the current methods of manual georeferencing. Low cost: With the targets, and sufficiently long enough measurement periods, data just as accurate is available at a low price. Solar powered: when used outside, the devices are absorbing more solar energy than required, leading to both operation and battery charging.

The data captured was used for a plethora of tasks including volumetric measurements, spot heights across these sites and boundary planning. This preferred embodiment has significant applications outside the world of accurate UAV based surveying. The applications can include scaling the data captured on asset inspections, allowing for precise point cloud measurements of fatigue and deflections.

The embodiments thereby provide a low cost, easy to use positioning device to provide highly accurate and largely automated georeferencing for aerial surveying. Most significantly, consumer grade, single frequency GPS receivers and antennas can indeed provide data accuracies comparable to geodetic grade units. Until now, unlocking the positioning precision in this low cost equipment meant individuals were required to both purchase an expensive RTK subscription and understand the logic and theory behind the post processing software RTKLIB, not an easy task. Now it is as simple as the user placing a rugged target out in the sun for two hours then turning on their phone hotspot. The user needs to know nothing about the underlying technology and is now able to produce survey grade datasets, without the effort or expense of sub-contracting traditional surveyors to capture GCPs.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A georeferencing target unit including:
   a generally planar top surface including a visual marker structure on said top surface, dimensioned to be observable at a distance by a remote visual capture device;
   an internal GPS tracking unit tracking a current position of the target unit, the current position being associated with a placement of the target unit according to a substantially constant dispersion pattern;
   a microcontroller and storage means for storing GPS tracking data;
   a wireless network interconnection unit for interconnecting wirelessly with an external network for the downloading of stored GPS tracking data;
   a power supply for driving the internal GPS tracking unit, microcontroller, storage and wireless network interconnection unit; and
   a user interface including an activation mechanism for activating the internal GPS tracking unit to track the current position of the target unit over an extended time frame and store the tracked GPS tracking data in the storage means.

2. The georeferencing target unit as claimed in claim 1 wherein, the georeferencing unit activates the wireless network interconnection unit to upload the stored tracked GPS tracking data to an external storage device once the georeferencing unit is in contact range of a wireless network.

3. The georeferencing target unit as claimed in claim 1 further including:
   a solar cell charging unit for charging the power supply.

4. The georeferencing target unit as claimed in claim 3 wherein said solar cell charging unit is included in said visual marker structure on the generally planar top surface.

5. The georeferencing target unit as claimed in claim 1 wherein said unit is generally stackable with other units.

6. The georeferencing target unit as claimed in claim 1 wherein said unit is of a substantially planar structure.

7. The georeferencing target unit as claimed in claim 1 wherein the top surface is at least about 60 cm long.

8. The georeferencing target unit as claimed in claim 1 wherein said internal GPS tracking unit implements PPP based tracking.

9. The georeferencing target unit as claimed in claim 1 further comprising an external processing unit configured to combine the tracked GPS tracking data with imagery captured substantially simultaneously by a remote visual tracking device, including imagery of the visual marker structure, and to process said imagery to determine a georeferenced version of said imagery.

10. The georeferencing target unit as claimed in claim 9 wherein said external processing unit further combines the tracked GPS tracking data with other GPS data to produce updated GPS data for combining with the captured imagery.

11. A method of georeferencing imagery, the method including the steps of:
    capturing the imagery using an airborne scanning device;
    simultaneously capturing GPS data of a series of points located within the imagery utilizing a series of portable GPS devices, wherein the GPS devices are placed according to a substantially constant dispersion pattern;
    uploading the captured imagery and GPS data to a computational server device; and
    processing the captured imagery and GPS data to georeference the imagery.

12. The method as claimed in claim 11 further comprising combining the GPS data with other GPS data to improve the accuracy of the location of the portable GPS devices.

* * * * *